United States Patent

Hopewell

(10) Patent No.: US 8,723,360 B2
(45) Date of Patent: May 13, 2014

(54) DISTRIBUTED ELECTRICAL GENERATION SYSTEM

(75) Inventor: Paul D. Hopewell, Leek (GB)

(73) Assignee: Rolls-Royce PLC, London (GB)

( * ) Notice: Subject to any disclaimer, the term of this patent is extended or adjusted under 35 U.S.C. 154(b) by 532 days.

(21) Appl. No.: 13/124,763

(22) PCT Filed: Aug. 21, 2009

(86) PCT No.: PCT/EP2009/006074
§ 371 (c)(1),
(2), (4) Date: Apr. 18, 2011

(87) PCT Pub. No.: WO2010/049027
PCT Pub. Date: May 6, 2010

(65) Prior Publication Data
US 2011/0198847 A1 Aug. 18, 2011

(30) Foreign Application Priority Data

Oct. 27, 2008 (GB) .................................. 0819561.2

(51) Int. Cl.
*H02J 1/10* (2006.01)
(52) U.S. Cl.
USPC .............................................. 307/57; 307/58
(58) Field of Classification Search
USPC ....................................................... 307/57, 58
See application file for complete search history.

(56) References Cited

U.S. PATENT DOCUMENTS

| 5,798,631 A * | 8/1998 | Spee et al. ....................... 322/25 |
| 2010/0133844 A1* | 6/2010 | Pearce ............................. 290/54 |
| 2010/0188874 A1* | 7/2010 | Sato et al. .................. 363/21.18 |

FOREIGN PATENT DOCUMENTS

| EP | 1 742 235 A2 | 1/2007 | |
| WO | WO 97/45908 A1 | 12/1997 | |
| WO | WO 01/52379 A2 | 7/2001 | |
| WO | WO 0152379 A2 * | 7/2001 | ................ H02J 3/36 |
| WO | WO 2008/002226 A1 | 1/2008 | |

OTHER PUBLICATIONS

International Search Report in International Application No. PCT/EP2009/006074; dated Dec. 29, 2009.
Written Opinion of the International Searching Authority in International Application No. PCT/EP2009/006074; dated Dec. 29, 2009.

* cited by examiner

*Primary Examiner* — Robert L. DeBeradinis
(74) *Attorney, Agent, or Firm* — Oliff PLC

(57) ABSTRACT

A distributed electrical generation system includes a plurality of turbines, generators, diode bridges, transformers and high voltage diodes. The system further includes a HVDC-cable and a high voltage inverter bridge. Each turbine drives a respective one of a plurality of electrical generators producing an alternating current. Each electrical generator is electrically connected to an associated diode bridge and each diode bridge rectifies the alternating current to a direct current. Each diode bridge is electrically connected to an associated transformer and each transformer steps up the direct current to a high voltage direct current. Each transformer is electrically connected in parallel to a high voltage direct current cable by associated high voltage diodes. The high voltage direct current cable is electrically connected to the high voltage inverter bridge. The high voltage inverter bridge converts the direct current to alternating current.

19 Claims, 3 Drawing Sheets

DISTRIBUTED ELECTRICAL GENERATION SYSTEM

The present invention relates to a distributed electrical generation system and in particular to a distributed electrical generation system for wind turbines or tidal turbines.

Distributed electrical generation systems comprise a plurality of dispersed electrical generators. Each electrical generator is driven by a respective one of a plurality of dispersed wind turbines, a plurality of water turbines or a plurality of tidal turbines.

In a dispersed electrical generation system it is necessary to collect the electrical power generated from each of the electrical generators, which are relatively small electrical generators, and to aggregate it to enable connection to a host utility electrical grid at a limited number of access, or connection, points. In most conventional dispersed electrical generation systems there is a single access, or connection, point to the host utility electrical grid and the number of individual turbines connected has exceeded a hundred.

A conventional distributed electrical generation system comprises a plurality of electrical generators, each of which is driven by a wind turbine, a tidal turbine etc, which produce electrical power. Each electrical generator has an associated transformer, which transforms, steps up, the voltage produced by the electrical generator to a higher voltage, e.g. 33-36 kV. A network of electrical cables collects the electrical power produced by the electrical generators and supplies the electrical power to a substation. A further transformer at the substation transforms, steps up, the voltage to a higher voltage, e.g. 132 kV or greater. The substation is connected to the host utility electrical grid by a transmission system.

In the case of offshore wind turbines and tidal turbines the substation is built on a platform standing sufficiently high above the sea so as to prevent problems caused by waves and sea spray.

Conventionally dispersed electrical generation systems, e.g. offshore wind turbines or onshore wind turbines, employ electrical generators producing alternating current (AC), an alternating current (AC) collection system and an alternating current (AC) transmission system because of the ease of voltage transformation and the well established nature of alternating current (AC) power systems.

Other dispersed electrical generation systems employ electrical generators producing alternating current (AC), an alternating current (AC) collection system and a high voltage direct current (HVDC) transmission system. In this system the power conversion equipment at the substation rectifies the alternating current (AC) to a direct current (DC) as well as stepping up to a higher voltage. Furthermore, there is an inversion step from a direct current (DC) to an alternating current (AC) at the point where the transmission system connects to the host utility electrical grid. The high voltage direct current (HVDC) transmission system is considered for dispersed electrical generation systems with a very large number of electrical generators or where the transmission system has a long underground cable or a sub-sea cable.

The electrical generator, whether a wind turbine, a tidal turbine or a water turbine, comprises a rotor, a shaft, a gearbox, an electrical generator and electrical power conditioning equipment. The electrical power conditioning equipment comprises a power electronic frequency converter, which is electrically connected to the electrical generator and is electrically connected to a step up transformer. This is quite a complicated arrangement. The electrical power conditioning equipment is contained in electrical cubicles and the electrical cubicles cannot be immersed in water. The electrical cubicles may be installed above sea level for offshore wind turbines or for tidal turbines only partially immersed in the sea. However, for submerged tidal turbines the electrical cubicles must be provided in an airtight nacelle and this adds significant cost and weight to the submerged tidal turbine.

The main disadvantage of the prior art is that the distributed electrical generators generally produce an alternating current (AC) output, at a suitable voltage, frequency and power quality. This requires the provision of specific equipment within the electrical generator to condition the output of the electrical generator and produce the refined alternating current. Power electronic converters are used for this purpose and one power electronic converter is required for each electrical generator. The electronic power converter may be fully-rated or partially rated in the case of a doubly fed induction generator. The power electronic converter is generally reliable but may be difficult to maintain especially if the distributed electrical generator system comprises submerged tidal turbines.

Accordingly the present invention seeks to provide a novel distributed electrical generation system which reduces, preferably overcomes, the above mentioned problem.

Accordingly the present invention provides a distributed electrical generation system comprising a plurality of turbines, a plurality of electrical generators, a plurality of AC to DC converters, a plurality of power electronic switches, a plurality of transformers, a plurality of high voltage diodes, a high voltage direct current cable and a high voltage DC to AC converter, each turbine being arranged to drive a respective one of the plurality of electrical generators, each electrical generator being arranged to produce an alternating current, each electrical generator being electrically connected to a respective one of the AC to DC converters, each AC to DC converter being arranged to rectify the alternating current to a direct current, each AC to DC converter being electrically connected to a respective one of the transformers via a respective one of the power electronic switches, each transformer being arranged to step up the direct current to a high voltage direct current, each transformer being electrically connected electrically in parallel to the high voltage direct current cable by a respective one of the high voltage diodes, each high voltage diode is arranged to produce a uni-directional current in the high voltage direct current cable, the high voltage direct current cable being electrically connected to the high voltage DC to AC converter, the high voltage DC to AC converter being arranged to convert the direct current to alternating current.

Preferably each power electronic switch comprising a snubber arranged to prevent damage to the power electronic switch when the power electronic switch switches off.

Preferably the electrical generators are permanent magnet electrical generators.

Preferably the turbine is a wind turbine, a water turbine or a tidal turbine.

Where at least one of the turbines is a tidal turbine, the high voltage winding of the transformer and the high voltage diode are mounted on a first support structure for the respective tidal turbine and the low voltage winding of the transformer, the electrical generator and the AC to DC converter are mounted on a second support structure for the respective tidal turbine.

The second support structure may comprise an open frame structure for the respective tidal turbine.

The second support structure may comprise a structure having a nacelle and the nacelle encloses the low voltage winding of the transformer, the electrical generator and the AC to DC converter of the respective tidal turbine.

Preferably all the turbines are tidal turbines.

Preferably the transformer is a splittable transformer, the core of the transformer is splittable into two portions, a low voltage winding is arranged on a first portion of the core and a high voltage winding is arranged on a second portion of the core.

The high voltage DC to AC converter is provided on land.

Preferably the or each AC to DC converter is a diode bridge. Preferably the high voltage DC to AC converter is a high voltage inverter bridge.

The present invention also provides a method of operating a distributed electrical generation system comprising a plurality of turbines, a plurality of electrical generators, a plurality of AC to DC converters, a plurality of power electronic switches, a plurality of transforms, a plurality of high voltage diodes, a high voltage direct current cable and a high voltage DC to AC converter, each transformer being electrically connected electrically in parallel to the high voltage direct current cable by a respective one of the high voltage diodes, the method comprising arranging for one or more of the turbines to drive a respective one of the electrical generators, generating an alternating current in at least one of the electrical generators and supplying the alternating current to a respective one of the AC to DC converters, converting the alternating current into direct current in at least one of the AC to DC converters, transforming the direct current to a higher voltage direct current in at least one of the transformers, controlling the flow of electrical current/energy from the low voltage side to the high voltage side of the transformer in at least one of the power electronic switches, supplying a undirectional current to the high voltage direct current cable through at least one of the high voltage diodes, supplying the undirectional current to the DC to AC converter and converting the direct current to an alternating current in the DC to AC converter.

The present invention will be more fully described by way of example with reference to the accompanying drawings in which:—

Figure 1:
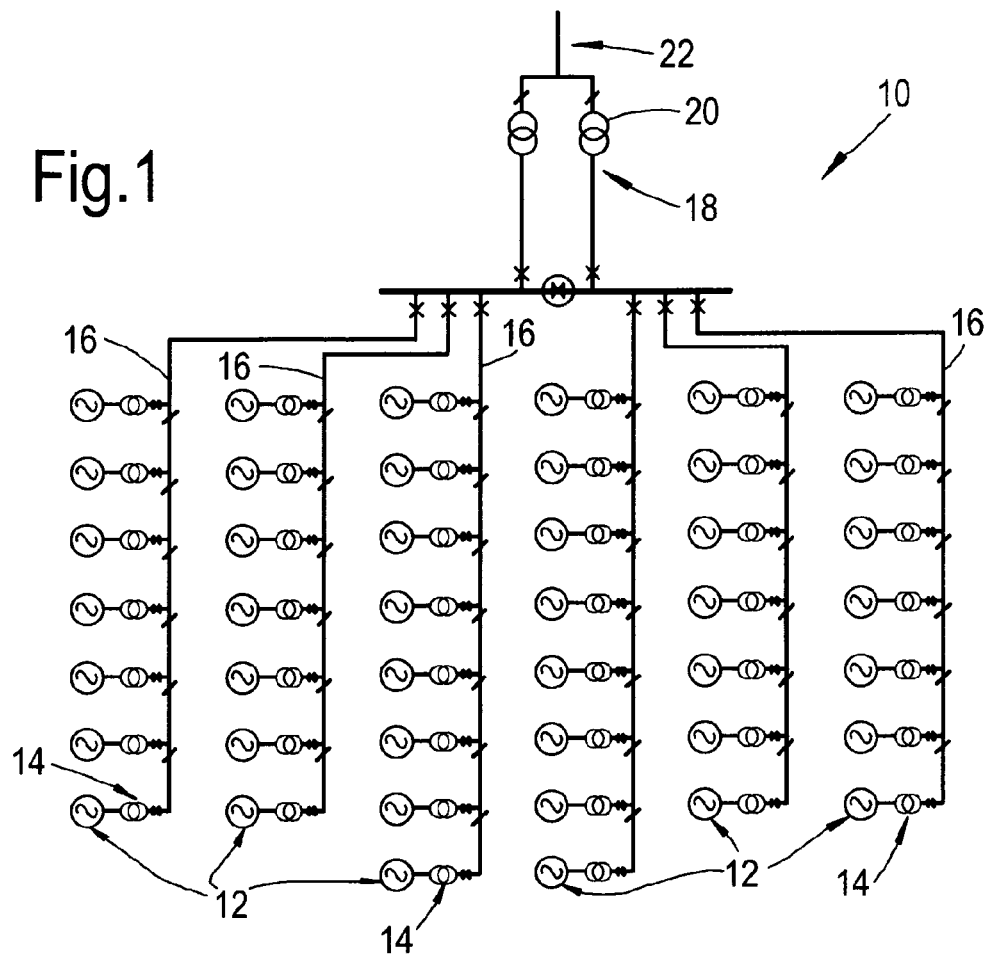
FIG. 1 shows a prior art dispersed electrical generation system.

A conventional distributed electrical generation system 10, as shown in FIG. 1, comprises a plurality of electrical generators 12, each of which is driven by a wind turbine, a tidal turbine etc, which produce electrical power. Each electrical generator 12 has an associated transformer 14, which transforms, steps up, the voltage produced by the electrical generator 12 to a higher voltage, e.g. 33-36 kV. A network of electrical cables 16 collects the electrical power produced by the electrical generators 12 and supplies the electrical power to a substation 18. A further transformer 20 at the substation 18 transforms, steps up, the voltage to a higher voltage, e.g. 132 kV or greater. The substation 18 is electrically connected to the host utility electrical grid by a transmission system 22.

Figure 2:
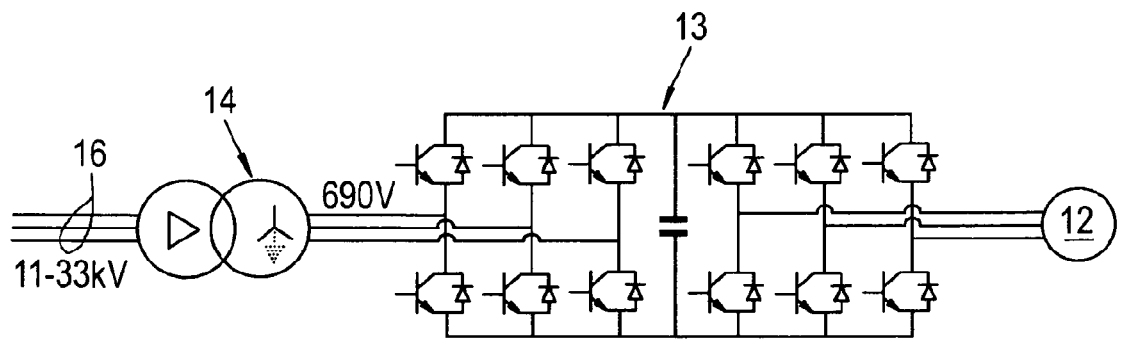
FIG. 2 shows a prior art individual dispersed electrical generator.

The electrical generator 12, as shown in FIG. 2, whether a wind turbine, a tidal turbine or a water turbine, comprises a rotor, a shaft, a gearbox, an electrical generator and an electrical power conditioning equipment. The electrical power conditioning equipment comprises a power electronic frequency converter 13, which is electrically connected to the electrical generator 12 and is electrically connected to a step up transformer 14. This is quite a complicated arrangement. The electrical power conditioning equipment is contained in electrical cubicles and the electrical cubicles cannot be immersed in water. The electrical cubicles may be installed above sea level for offshore wind turbines or for tidal turbines only partially immersed in the sea. However, for submerged tidal turbines the electrical cubicles must be provided in an airtight nacelle and this adds significant cost and weight to the submerged tidal turbine.

Figure 3:
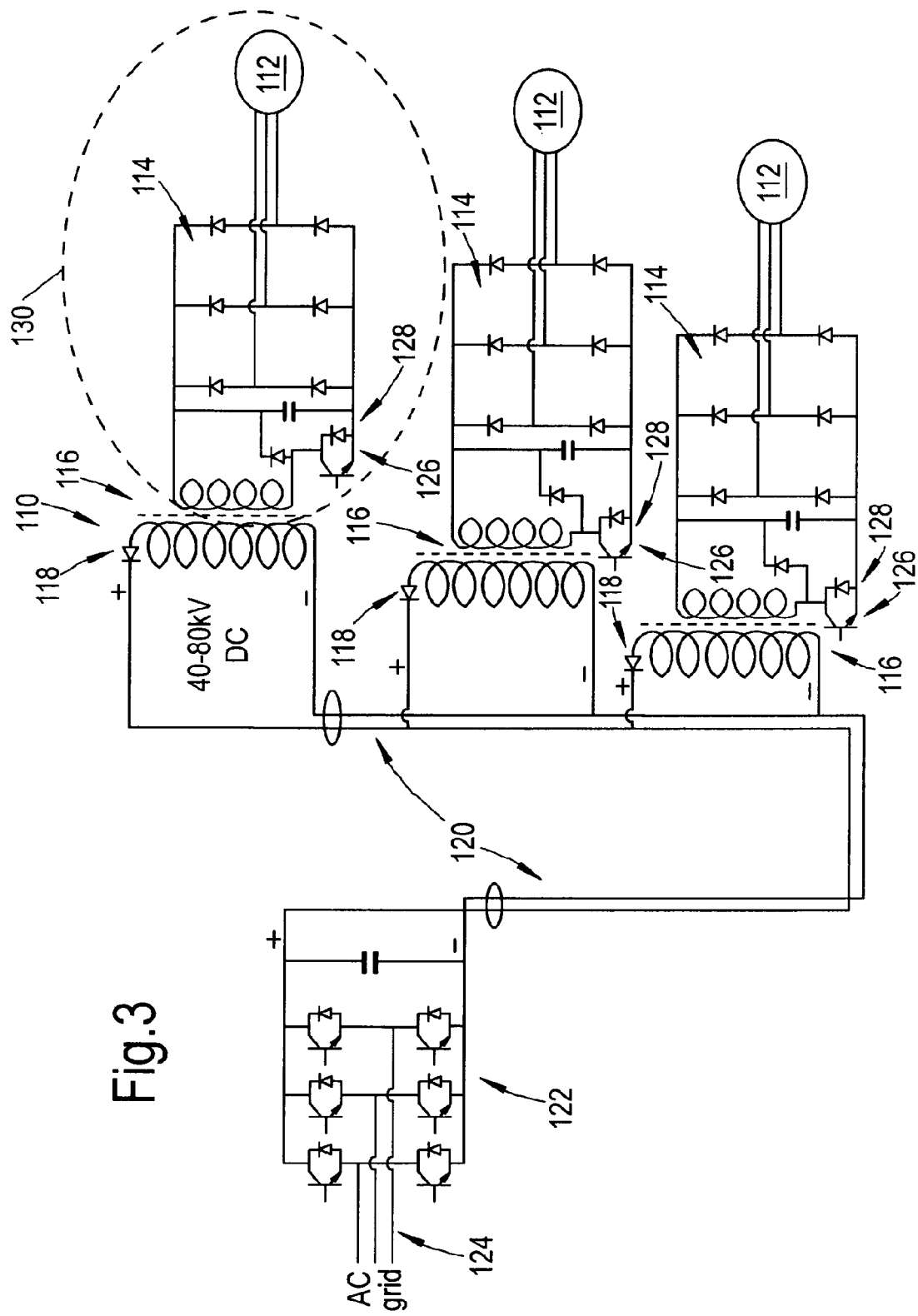
FIG. 3 shows a schematic of the electrical arrangement of a dispersed electrical generation system according to the present invention.
Figure 4:
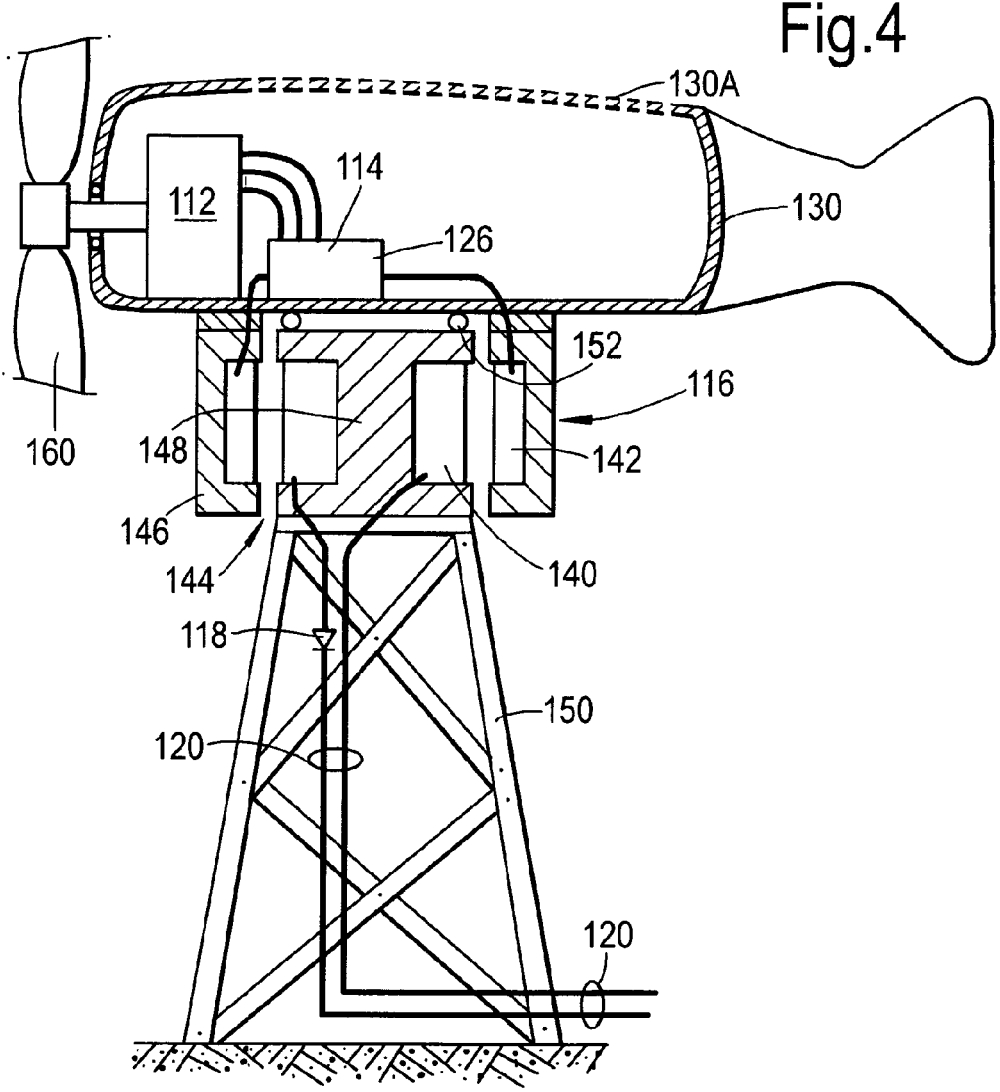
FIG. 4 shows a schematic arrangement of a single tidal turbine.
Figure 5:
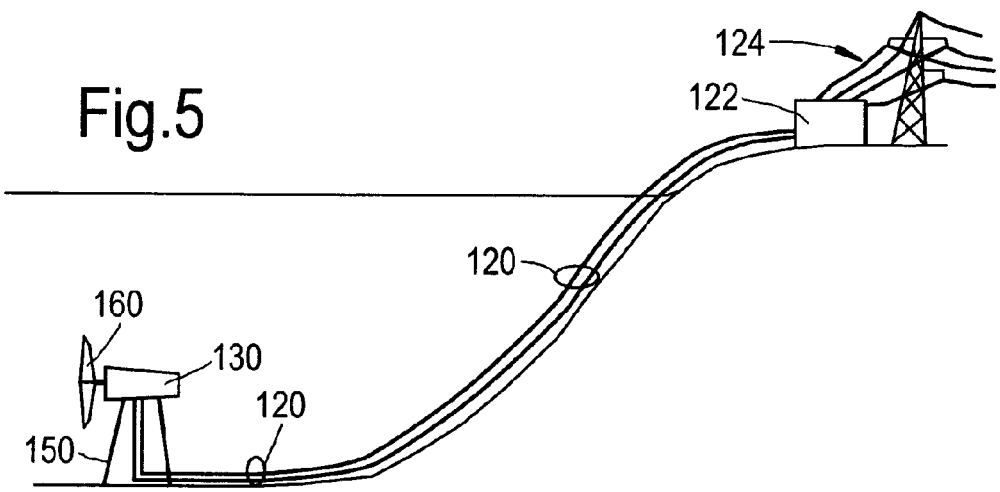
FIG. 5 shows a schematic of the mechanical arrangement of a dispersed electrical generation system according to the present invention.

A distributed electrical generation system 110 according to the present invention, as shown in FIGS. 3, 4 and 5, comprises a plurality of turbines 160, a plurality of electrical generators 112, a plurality of diode bridges 114, a plurality of transformers 116, a plurality of high voltage diodes 118, a high voltage direct current cable 120 and a high voltage inverter bridge 122. Each turbine 160 is arranged to drive a respective one of the plurality of electrical generators 112 and each electrical generator 112 is arranged to produce an alternating current. Each electrical generator 112 is electrically connected to a respective one of the diode bridges 114 and each diode bridge 114 is arranged to rectify the alternating current to a direct current. Each diode bridge 114 is electrically connected to a respective one of the transformers 116 and each transformer 116 is arranged to step up the direct current to a high voltage direct current. Each transformer 116 is electrically connected in parallel to the high voltage direct current cable 120 by a respective one of the high voltage diodes 118. Each high voltage diode 118 is arranged to produce a uni-directional current in the high voltage direct current cable 120. The high voltage direct current cable 120 is electrically connected to the high voltage bridge 122 and the high voltage inverter bridge 122 is arranged to convert the direct current to alternating current. The high voltage inverter bridge 122 is connected to the alternating current grid 124.

The distributed electrical generator system 110 comprises a plurality of power electronic switches, or power electronic choppers, 126 and each power electronic switch 126 is associated with a respective one of the diode bridges 114. Each power electronic switch 126 comprises a snubber 128 arranged to prevent damage to the power electronic switch 126 when the power electronic switch 126 switches off. The power electronic switch 126 is operated in such a way that its mark-space ratio is varied to affect a desired average current in the permanent magnet electrical generator 112, hence giving a desired electrical generator 112 torque. The mark-space ratio is continuously controlled using a maximum power point tracker algorithm to automatically achieve the maximum available power from the prevailing tide, or wind, conditions. The voltage of the direct current collection system is set and maintained by the high voltage inverter bridge 122, so that a fly-back, or boost converter, acts as a charge pump, sending packets of energy from the low voltage side of the transformer 116, electrical generator 112 side, to the high voltage side of the transformer 116, high voltage direct current cable 120 and high voltage inverter bridge 122 side. The magnitude of each packet of energy and the number of packets of energy delivered per unit time is determined by the mark-space ratio and the switching frequency of the power electronic switch, or power electronic chopper 126. The fly-back converters enables each turbine and associated electrical generator 112 to export/supply its electrical output/electrical current, even when other turbines 160 and associated electrical generators 112 are providing a higher electrical output/electrical current.

The transformer 116 may be a conventional transformer. Preferably the transformer 116 is a splittable transformer, as shown in FIG. 4, in which the core 144 of the transformer 116 is splittable into two portions 146, 148 and a low voltage winding 142 is arranged on a first portion 146 of the core 144 and a high voltage winding 140 is arranged on a second portion 148 of the core 144. The low voltage winding 142 is electrically connected to the diode bridge 114 and the high voltage winding 140 is electrically connected to the high voltage direct current cable 120. The high voltage winding comprises a greater number of turns than the low voltage winding 142. The transformer 116 comprises a single phase only to facilitate unrestricted rotation. The transformer 116 is preferably a rotatable transformer such that the high voltage winding 140 and the second portion 148 of the core 144 are secured to the first support structure 150, which is a static structure secured to the sea, or river, bed etc and the low voltage winding 142 and first portion 146 of the core 144 are secured to the second support structure, which is a rotatable structure, e.g. the nacelle 130. The second support structure 130 is rotatably mounted on the first support structure 150 and a bearing 152 may be provided to rotatably mount the second support structure 130 on the first support structure 150. The low voltage winding 142 is arranged coaxially around the high voltage winding 140, the low voltage winding 142 is wound within an annular cross-section first core portion 146 and the high voltage winding 140 is wound around a generally circular cross-section second core portion 148. It may be possible to arrange the high voltage winding coaxially within the low voltage winding and for the first core portion to be circular in cross-section and the second core portion to be annular in cross-section.

The electrical generators 112 may be any suitable type of electrical generators, but preferably are permanent magnet electrical generators.

The turbines may be wind turbines, water turbines or tidal turbines.

Where at least one of the turbines 160 is tidal turbine, the high voltage winding 140 of the transformer 116 and the high voltage diode 118 are mounted on a first support structure 150 for the respective tidal turbine 160 and the low voltage winding 142 of the transformer 116, the electrical generators 112 and the diode bridges 114 are mounted on second support structure 130 for the respective tidal turbine 160. The second support structure 130 may simply comprise an open frame structure for the respective tidal turbine 160. Alternatively the second support structure may comprise a structure having a nacelle 130A, indicated by the dashed line in FIG. 3, to enclose the respective tidal turbine 160. The high voltage winding 140 of the transformer 116 remain on the support structure 150 for the respective tidal turbine 160 when the nacelle 130 and its contents mentioned above are taken to the surface of the sea for maintenance or replacement.

All the turbines may be tidal turbines, all the turbines may be wind turbines, all the turbine may be water turbines or some of the turbines may be wind turbines and some of the turbines may be tidal turbines.

Preferably the high voltage inverter bridge 122 is provided on land as shown in FIG. 5. The high voltage inverter bridge 122 may be mounted in any convenient location, but it is better if it is located on land rather than a platform at sea. It is particularly so for tidal turbines where the distance from the turbine farm to land is likely to be comparatively short when compared to offshore wind turbines. For tidal turbines located a modest distance from the shore/land it is practical to provide a small number of high capacity, high voltage direct current cables as opposed to one or two high voltage alternating current cables. A significant advantage of the direct current collection system of the present invention is that the direct current collection system avoids any loss of cable capacity due to reactive power transfer and thus allows a high transfer capacity for a given size of electrical cable. The present invention allows the distributed electrical generation system to operate at a voltage high enough to allow efficient and effective transmission from the turbines to shore/land, without requiring a second, higher, voltage level as is required for conventional all alternating current collection and transmission systems or alternating current collection and direct current transmission systems.

The permanent magnet electrical generator, or alternator, 112 produces a voltage and frequency according to the operating speed. The diode bridge 114 is passive and is located within the body of the electrical generator 112 for compactness, but may be located elsewhere. The snubber 128 is associated with the power electronic switch, or power electronic chopper, 126 in order to prevent damage to the power electronic switch, or power electronic chopper, 126 arising due to excess voltage caused by leakage flux as the power electronic switch, or power electronic chopper, 126 switches off. The high voltage inverter bridge 122 may be conventional or may be multi-level high voltage direct current technology.

The advantage of the present invention is that it greatly simplifies the electronics in the nacelle/open frame structure of a tidal turbine. It enables a fully immersed and un-sealed nacelle for a tidal turbine or dispenses with the nacelle and reduces costs. It reduces electrical losses. It enables a fully immersed tidal turbine to be cooled using the tidal stream and dispenses with the need for auxiliary pumps, fans and associated equipment for cooling of the electrical equipment in the nacelle of a tidal turbine. The high voltage inverter bridge may be located on dry land. The direct current collection and transmission system provides better efficiency and does not have reactive power considerations. The use of fly-back converters enables each turbine and associated electrical generator to export/supply its electrical output/electrical current, even when other turbines and associated electrical generators are providing a higher electrical output/electrical current.

The present invention may be employed wherever there are a plurality of independent electrical generators to be electrically connected together. As previously mentioned it is applicable to wind turbines, water turbines, tidal turbines or other renewable electrical generators. The present invention is also applicable to aircraft, marine vessels or industrial sites with a plurality of electrical generators. In the case of aircraft, the gas turbine engines are provided with electrical generators. These electrical generators operate at a speed determined by the operating conditions of the gas turbine engine. This means that the output frequency and voltage are both a function of the rotational speed of the gas turbine engine and the present invention allows the electrical generators of the gas turbine engine to be operated electrically in parallel.

Although the present invention has been described with reference to a diode bridge to convert the alternating current produced by the electrical generator to direct current any other suitable AC to DC converters may be used, but the diode bridge is preferred because it is simple and reliable.

Although the present invention has been described with reference to a high voltage inverter bridge to convert the direct current to alternating current any other suitable high voltage DC to AC converter may be used.

The invention claimed is:

1. A distributed electrical generation system comprising a plurality of turbines, a plurality of electrical generators, a plurality of AC to DC converters, a plurality of power electronic switches, a plurality of transformers, a plurality of high voltage diodes, a high voltage direct current cable and a high voltage DC to AC converter, each turbine being arranged to drive a respective one of the plurality of electrical generators, each electrical generator being arranged to produce an alternating current, each electrical generator being electrically connected to a respective one of the AC to DC converters, each AC to DC converter being arranged to rectify the alternating current to a direct current, each AC to DC converter being electrically connected to a respective one of the transformers via a respective one of the power electronic switches, each transformer being arranged to step up the direct current to a high voltage direct current, each transformer being electrically connected electrically in parallel to the high voltage direct current cable by a respective one of the high voltage diodes, each high voltage diode is arranged to produce a uni-directional current in the high voltage direct current cable, the high voltage direct current cable being electrically connected to the high voltage DC to AC converter, the high voltage DC to AC converter being arranged to convert the direct current to alternating current.

2. A distributed electrical generation system as claimed in claim 1 wherein each power electronic switch comprising a snubber arranged to prevent damage to the power electronic switch when the power electronic switch switches off.

3. A distributed electrical generation system as claimed in claim 1 wherein the electrical generators are permanent magnet electrical generators.

4. A distributed electrical generation system as claimed in claim 1 wherein the turbine is a wind turbine, a water turbine or a tidal turbine.

5. A distributed electrical generation system as claimed in claim 4 wherein at least one of the turbines is a tidal turbine, a high voltage winding of the transformer and the high voltage diode are mounted on a first support structure for a respective tidal turbine and a low voltage winding of the transformer, the electrical generator and the AC to DC converter are mounted on a second support structure for the respective tidal turbine.

6. A distributed electrical generation system as claimed in claim 5 wherein the second support structure comprises an open frame structure for the respective tidal turbine.

7. A distributed electrical generation system as claimed in claim 5 wherein the second support structure comprises a structure having a nacelle and the nacelle encloses the low voltage winding of the transformer, the electrical generator and the AC to DC converter of the respective tidal turbine.

8. A distributed electrical generation system as claimed in claim 4 wherein at least one of the turbines is a tidal turbine,
   a high voltage winding of the transformer and the high voltage diode are mounted on a first support structure for a respective tidal turbine,
   a low voltage winding of the transformer, the electrical generator, the tidal turbine and the AC to DC converter are mounted on a second support structure for the respective tidal turbine,
   the second support structure is rotatable relative to the first support structure,
   the transformer is a rotatable transformer, a core of the transformer is split into a first portion and a second portion, the second portion of the core is mounted on the first support structure, the first portion of the core is mounted on the second support structure, the high voltage winding of the transformer is arranged on the second portion of the core, and the low voltage winding of the transformer is arranged on the first portion of the core.

9. A distributed electrical generation system as claimed in claim 1 wherein the high voltage DC to AC converter is operable to set and maintain a voltage of the AC to DC converter to thereby deliver packets of energy from the low voltage side of the transformer to the high voltage side of the transformer.

10. A distributed electrical generation system as claimed in claim 1 wherein the power electronic switch is operable to have a variable mark-space ratio to thereby provide a desired average current in the electrical generator.

11. A distributed electrical generation system as claimed in claim 1 wherein the power electronic switch is operable to continuously control its mark-space ratio using a maximum power point tracker algorithm to thereby automatically achieve a maximum available power from the respective turbine.

12. A distributed electrical generation system as claimed in claim 1 wherein the high voltage DC to AC converter comprises a high voltage inverter bridge.

13. A distributed electrical generation system as claimed in claim 1 wherein each AC to DC converter comprises a diode bridge.

14. A method of operating a distributed electrical generation system comprising a plurality of turbines, a plurality of electrical generators, a plurality of AC to DC converters, a plurality of power electronic switches, a plurality of transformers, a plurality of high voltage diodes, a high voltage direct current cable and a high voltage DC to AC converters, each transformer being electrically connected electrically in parallel to the high voltage direct current cable by a respective one of the high voltage diodes, the method comprising arranging for one or more of the turbines to drive a respective one of the electrical generators, generating an alternating current in at least one of the electrical generators and supplying the alternating current to a respective one of the AC to DC converters, converting the alternating current into direct current in at least one of the AC to DC converters, transforming the direct current to a high voltage direct current in at least one of the transformers, controlling the flow of electrical current/energy from a low voltage side to a high voltage side of the transformer in at least one of the power electronic switches, supplying a unidirectional current to the high voltage direct current cable through at least one of the high voltage diodes, supplying the unidirectional current to the DC to AC converter and converting the direct current to an alternating current in the DC to AC converter.

15. A method as claimed in claim 14 wherein the high voltage DC to AC converter sets and maintains a voltage of the AC to DC converter to thereby deliver packets of energy from the low voltage side of the transformer to the high voltage side of the transformer.

16. A method as claimed in claim 15 wherein the magnitude of each packet of energy and the number of packets of energy delivered per unit time is determined by a mark-space ratio and switching frequency of the power electronic switch.

17. A method as claimed in claim 14 wherein the power electronic switch has a variable mark-space ratio to thereby provide a desired average current in the electrical generator.

18. A method as claimed in claim 14 wherein the power electronic switch continuously controls its mark-space ratio using a maximum power point tracker algorithm to thereby automatically achieve a maximum available power from the respective turbine.

19. A distributed electrical generation system comprising a plurality of turbines, a plurality of electrical generators, a plurality of AC to DC converters, a plurality of power electronic switches, a plurality of transformers, a plurality of high voltage diodes, a high voltage direct current cable and a high voltage DC to AC converter, each turbine being arranged to drive a respective one of the plurality of electrical generators, each electrical generator being arranged to produce an alternating current, each electrical generator being electrically connected to a respective one of the AC to DC converters, each AC to DC converter being arranged to rectify the alternating current to a direct current, each AC to DC converter comprises a diode bridge, each AC to DC converter being electrically connected to a respective one of the transformers via a respective one of the power electronic switches, each transformer being arranged to step up the direct current to a high voltage direct current, each transformer being electrically connected electrically in parallel to the high voltage direct current cable by a respective one of the high voltage diodes, each high voltage diode is arranged to produce a unidirectional current in the high voltage direct current cable, the high voltage direct current cable being electrically connected to the high voltage DC to AC converter, the high voltage DC to AC converter being arranged to convert the direct current to alternating current, and the high voltage DC to AC converter comprises a high voltage inverter bridge.

\* \* \* \* \*